United States Patent
Vainsencher et al.

(10) Patent No.: US 9,448,954 B2
(45) Date of Patent: Sep. 20, 2016

(54) METHOD AND AN APPARATUS FOR COHERENCY CONTROL

(75) Inventors: Leonardo Vainsencher, Tel Aviv (IL);
Yaron P. Folk, Petah Tikva (IL); Yuval Itkin, Zoran (IL)

(73) Assignee: DSP GROUP LTD., Herzeliya (IL)

( * ) Notice: Subject to any disclaimer, the term of this patent is extended or adjusted under 35 U.S.C. 154(b) by 593 days.

(21) Appl. No.: 14/000,216

(22) PCT Filed: Feb. 28, 2011

(86) PCT No.: PCT/IL2011/000195
§ 371 (c)(1),
(2), (4) Date: Dec. 3, 2013

(87) PCT Pub. No.: WO2012/117389
PCT Pub. Date: Sep. 7, 2012

(65) Prior Publication Data
US 2014/0082241 A1    Mar. 20, 2014

(51) Int. Cl.
  *G06F 13/24* (2006.01)
  *G06F 13/00* (2006.01)
  *G06F 12/08* (2016.01)
  *G06F 13/16* (2006.01)

(52) U.S. Cl.
  CPC .......... *G06F 13/24* (2013.01); *G06F 12/0804* (2013.01); *G06F 13/1663* (2013.01)

(58) Field of Classification Search
  USPC ........................... 711/141–146; 710/260–269
  See application file for complete search history.

(56) References Cited

U.S. PATENT DOCUMENTS

| | | | | |
|---|---|---|---|---|
| 6,298,418 B1* | 10/2001 | Fujiwara | ............. | G06F 12/0833 711/144 |
| 7,320,056 B2* | 1/2008 | Shimada | ............. | G06F 13/1663 711/147 |
| 7,506,107 B2* | 3/2009 | Yasui | ....................... | G06F 15/16 711/141 |
| 7,669,015 B2* | 2/2010 | Dice | ....................... | G06F 9/466 711/152 |
| 7,941,499 B2* | 5/2011 | Bruce | ..................... | G06F 9/546 709/212 |
| 2005/0044174 A1* | 2/2005 | Landin | ................ | G06F 12/0831 709/217 |
| 2006/0230237 A1* | 10/2006 | Sakamoto | ........... | G06F 12/0822 711/141 |

* cited by examiner

*Primary Examiner* — Raymond Phan
(74) *Attorney, Agent, or Firm* — Reches Patents

(57) ABSTRACT

The subject matter discloses a method for data coherency; the method comprising receiving an interrupt request for interrupting a CPU; wherein the interrupt request is from one of a plurality of modules; wherein the interrupt request notifying a writing instruction of a first data by the one of the plurality of modules to a shared memory; and wherein the shared memory is accessible to the plurality of modules through a shared bus; suspending the interrupt request; validating a completion of an execution of the writing instruction; wherein the validating is performed after the suspending; and resuming the interrupt request after the completion of the execution of the writing is validated, whereby to notify a to the CPU about the completion of the execution of the writing instruction.

19 Claims, 6 Drawing Sheets

METHOD AND AN APPARATUS FOR
COHERENCY CONTROL

BACKGROUND

The present disclosure relates to controlling the operation of modules on a bus in general, and to coherency control, in particular.

In computer architecture, a bus is a subsystem that transfers data between computer components inside a computer or between computers. For example, multiple modules sharing a shared bus may transfer data to a shared memory to be used by one or more CPUs. Such modules may be, for example, external peripherals, such as, for example, a display control, an LCD control and the like.

Such a module, typically issues an interrupt to the CPU after transferring the data in order to notify the CPU about the transfer. In some cases, the interrupt may be issued before the completion of executing the write instruction and thus, before the data is actually written. For example, such a case may occur since the data may be cached in a buffer, or the execution of the instruction may be pended due to a collision. Such cases may cause the CPU to perform instructions on data that has not yet been stored.

The memory buffer may be a FIFO (first in first out) buffer, which may be used for buffering the data received from the plurality of modules that are connected to the same bus. The buffering is for enabling the bus arbiter to control the whole data received from the plurality of modules for avoiding loss of data.

One method known in the art to avoid the problem of notifying the CPU before the data is written in the memory is by performing a read instruction after a write instruction. In such a method, each module may perform a read instruction after the write instruction for reading one or more blocks from the data written by the write instruction; wherein the reading is for verifying that the data has been written. Since a read instruction has a lower priority comparing to a write instruction, the read will always be performed after the completing of the whole write instruction and, thus reading one or more blocks from the data written by the write instruction ensures the completing of the write instruction. This method is termed herein as "read after write".

Another method known in the art is to monitor the data lines that connect the bus to the memory. Such a method entails the addition of memory lines and may be cumbersome, expensive and inefficient. Such a method may require the monitoring of about one hundred lines per client device, depending on the bus type.

BRIEF SUMMARY

One exemplary embodiment of the disclosed subject matter is a method for data coherency; the method comprising receiving an interrupt request for interrupting a CPU; wherein the interrupt request is from one of a plurality of modules; wherein the interrupt request notifying a writing instruction of a first data by the one of the plurality of modules to a shared memory; and wherein the shared memory is accessible to the plurality of modules through a shared bus; suspending the interrupt request; validating a completion of an execution of the writing instruction; wherein the validating is performed after the suspending; and resuming the interrupt request after the completion of the execution of the writing is validated, whereby to notify a to the CPU about the completion of the execution of the writing instruction. In some embodiments, the validating further comprising writing a second data to the shared memory; wherein a size of the second data is equivalent to a size of a buffer of a memory controller; and wherein the writing of the second data is for pushing said first data from the buffer of the memory controller to the shared memory. In some embodiments, the size of the second data is equivalent to the size of a buffer of the memory controller and a size of a buffer of a bus arbiter ; and wherein the writing of the second data is for pushing said first data from the buffer of the memory controller and from the buffer of the bus arbiter to the shared memory. The validating further comprising read after write. In some embodiments, the receiving further comprising receiving a plurality of interrupt request from a plurality of modules, the suspending further comprising suspending the plurality of interrupt requests and the resuming further comprising resuming the plurality of interrupt request thereby to perform a single validating for the plurality of interrupt request, thereby to improve performance.

One exemplary embodiment of the disclosed subject matter is an apparatus for coherency control; the apparatus comprising an interrupt module for receiving an interrupt request for interrupting a CPU and for suspending the interrupt request; wherein the interrupt request is from one of a plurality of modules; wherein the interrupt request is for notifying a writing of a first data by the one of the plurality of modules to a shared memory, and wherein the shared memory is accessible to the plurality of modules through a shared bus; a validation module for validating a completion of the execution of the writing of the first data; wherein the validating is performed after the suspending; and a main control module for resuming the interrupt request after the completion of the execution of the writing is validated. In some embodiments, the interrupt suspend module further comprises a plurality of AND logic gates for receiving a plurality of interrupt requests wherein the validation module is further configured for validating the plurality of interrupt requests with a single validation process and the main control module is further configured for resuming the plurality of interrupt requests upon the completion of the execution of the validating process.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters notify corresponding or like components. Unless notified otherwise, the drawings provide exemplary embodiments or aspects of the disclosure and do not limit the scope of the disclosure. In the drawings.

DETAILED DESCRIPTION

One technical problem dealt with by the disclosed subject matter is to efficiently ensure that a CPU is notified about writing a data to a shared memory by a module only after the writing instruction is completed. The module may be of a plurality of modules. The plurality of modules may be connected to a shared memory via a shared bus or separate busses.

One technical solution is to provide a coherency control module that suspends the issuing of the notification until the writing instruction is completed. In such a case, the notification may be resumed only after verifying the completion of the execution of the writing instruction. The notification may be an interrupt.

According to some embodiments of the disclosed subject matter, the verification may be performed by issuing a read after write by the coherency control module. By read after write is meant reading one or more words from the memory for verifying the writing of the data. Such a solution is more efficient comparing to the prior art read after write solution, since the coherency control module may perform a read after write for a plurality of modules' write operation.

According to some other embodiments of the disclosed subject matter, the verification may be performed by emptying one or more buffers that queue data due to collision. Emptying may be done by writing data that has a size equal or greater than the size of the buffers to be emptied.

Figure 1:
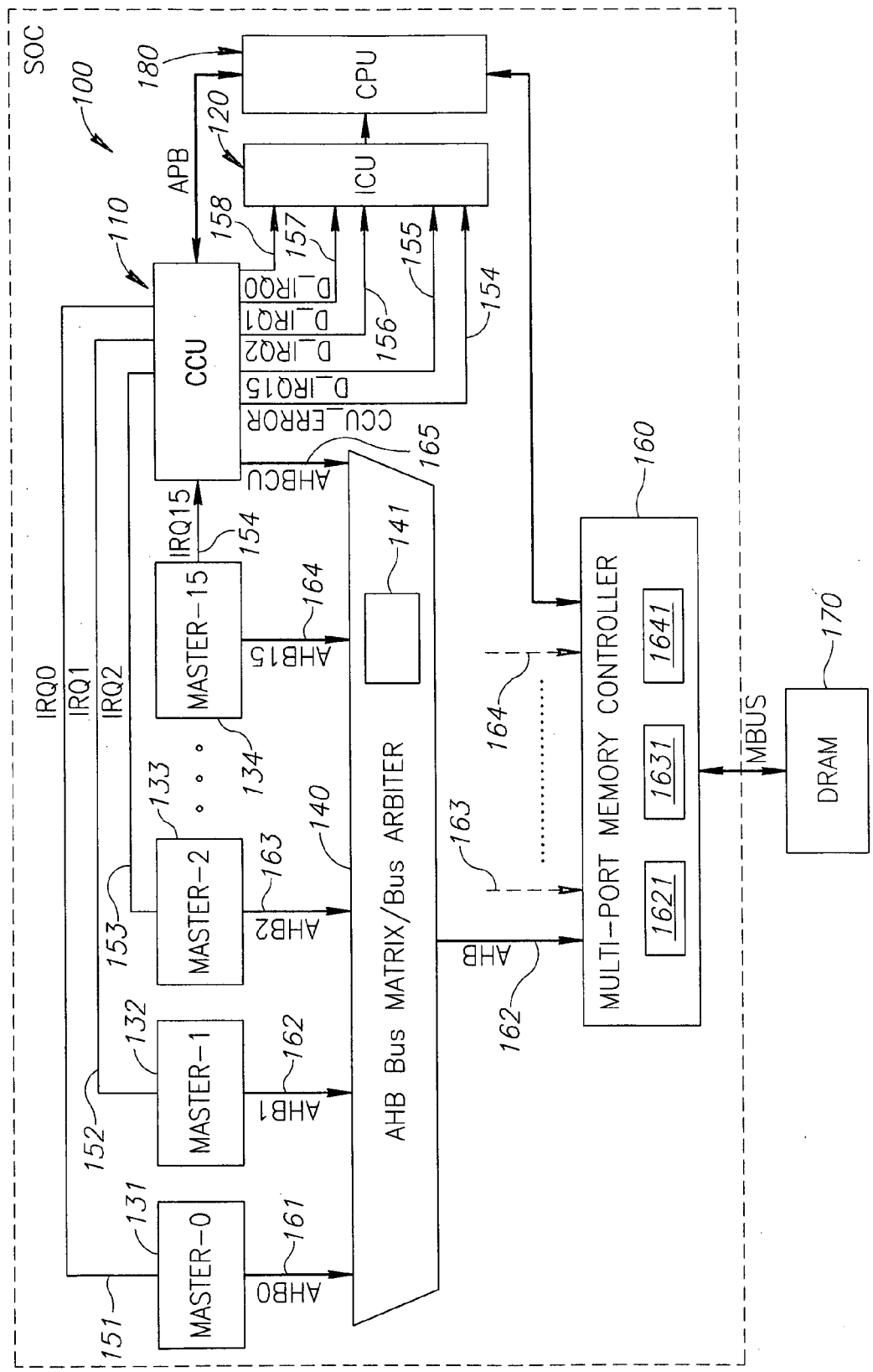
FIG. 1 shows a schematic drawing of an environment comprising a coherency io control module, in accordance with some exemplary embodiments of the subject matter.

Referring now to FIG. 1, showing a schematic drawing of an environment comprising a coherency control module, in accordance with some exemplary embodiments of the subject matter. System 100 comprises a plurality of modules shown as 131,132,133 and 134, A Coherency control module 110 (CCU), an Interrupt Control unit (ICU) 120, a bus arbiter 140, a multi port memory controller 160 and a shared memory 170. The plurality of modules shown as 131,132, 133 and 134 are connected to a shared bus 162 via the bus matrix 140 controlled by the bus arbiter 140 for accessing the shared memory 170. The CPU 180 may process the data written by the plurality of modules to the shared memory 170.

The coherency control module (CCU) 110 may suspend an interrupt request from one or more modules of the plurality of modules to the CPU 180 until the write instruction of the one or more modules is completed. In such a case, the interrupt may be reissued only after the completion of the writing to the memory is verified. Such a suspension ensures that the CPU accesses the data only after the writing instruction is completed. In some exemplary embodiments, a single verification may be performed for a plurality of interrupts that are suspended; wherein the pluralities of interrupts are resumed after the single verification. In such a case, a single verification may verify the completion of the execution of all the instructions that are associated with the suspended interrupts for improving the performance.

Each one of the plurality of modules may be connected to a bus matrix/bus arbiter 140 via lines shown as AHB0 161, AHB1 162, AHB2 163 and AHB 15 164; the connection is for performing read and write instructions. Each module may comprise an interrupt request line from the module to the Coherency Control Module (CCU) 110. In the exemplary diagram the interrupt request line from module 131 is IRQ0 151, the interrupt request line from module 132 is IRQ1 151, the interrupt request line from module 133 is IRQ2 153 and the interrupt request line is from module 134 is IRQ15 154. Each interrupt request line may have a corresponding interrupt request line from the Coherency Control Module (CCU) 110 to the ICU 120. Thus, in the exemplary diagram, the IRQ0 151 line has a corresponding line D_IRQ0 158, IRQ1 152 line has a corresponding line D_IRQ1 157, IRQ2 153 line has a corresponding line D_IRQ2 156, IRQ15 134 line has a corresponding line D_IRQ15 154. The ICU 120 may be connected to a CPU 180 for controlling the CPU 180. Thus, if module 132 issues an interrupt request via line 152, after writing data to shared memory 170; the CCU 110 suspends the request until verifying that the data instruction has been completed and only then, the CCU 110 resumes the interrupt via line D-IRQ1 157.

The bus arbiter 140 is a controller that controls the access of the plurality of the modules to the shared bus 162. The access may be controlled according to priority of the modules or according to first in first out policy. The bus arbiter 140 may comprise a buffer 141 for queuing the data that is sent from the plurality of modules shown as 131, 132,133 and 134. In the exemplary diagram, the bus arbiter is an AHB bus. The Bus Arbiter 140 may be connected to a multi port memory controller 160 via shared bus 162. In the exemplary diagram, the bus is an AHB bus.

The multi port memory controller 160 may control the access of plurality of busses (not shown) as well as the access of the CPU 180 to the shared memory 170. The access may be controlled according to first in first out policy. The access may be controlled by using a buffer per each bus and by queuing data in the buffer. In the exemplary diagram, a buffer 1621 holds data transferred through the bus arbiter 140 via AHB bus 162. The multi port memory controller 160 may comprise a plurality of ports. Each port may connect a specific bus to the multi-port memory controller 160. In the exemplary diagram, the bus arbiter 140 is connected the multi port memory controller 160 via a port that is connected to bus 162. According to one embodiment of the disclosed subject matter, verifying the writing of a data of one or more modules connected to the shared memory 170 via bus arbiter 140 may be done by emptying the buffer 1621. Emptying the buffer 1621 may be verified by writing data of a size equal to the size of the buffer 1621; such that if buffer 1621 comprises N words, N dummy words may be written for the verification. In some exemplary cases, the bus arbiter 140 also comprises a buffer 141 of a size N1 words. In such cases N1+N dummy words may be written for the verification. In the exemplary diagram, the data may be written by the Coherency Control Module (CCU) 110 via AHBCU line 165.

According to another embodiment of the disclosed subject matter, verifying the writing of a data of one or more modules connected to the shared memory 170 via bus arbiter 140 may be done by reading the one or more words from the data that was written to the memory.

Figure 2:
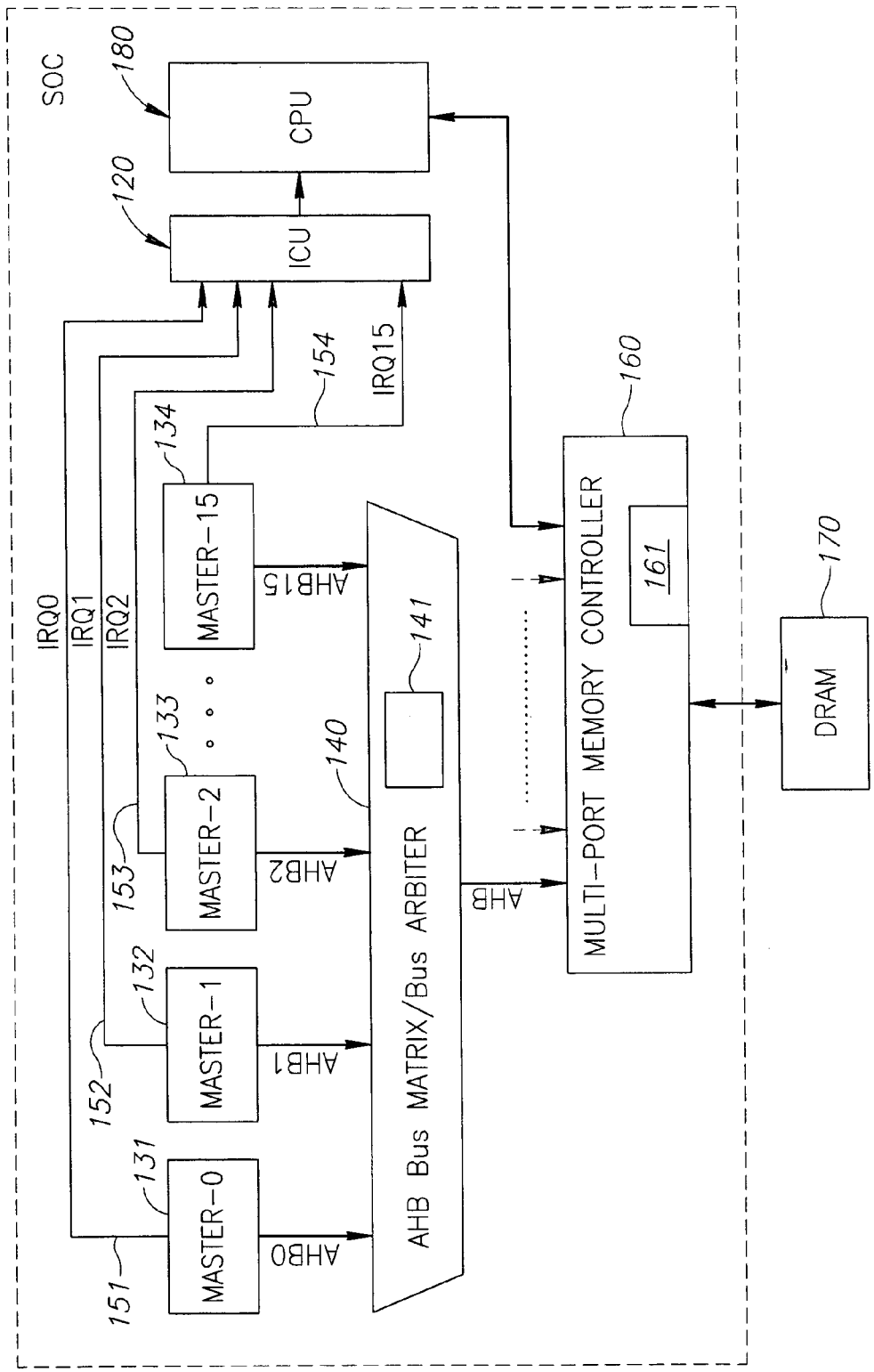
FIG. 2 shows a schematic drawing of an environment without a coherency control module.

FIG. 2 shows a schematic drawing of a system without a Coherency Control Module (CCU). As shown in the figure, the interrupt request lines IRQ0 151, IRQ1 152, IRQ2 153 and IRQ15 154 are connected directly to the ICU 120 and, thus, the interrupt request cannot be suspended.

Figure 3:
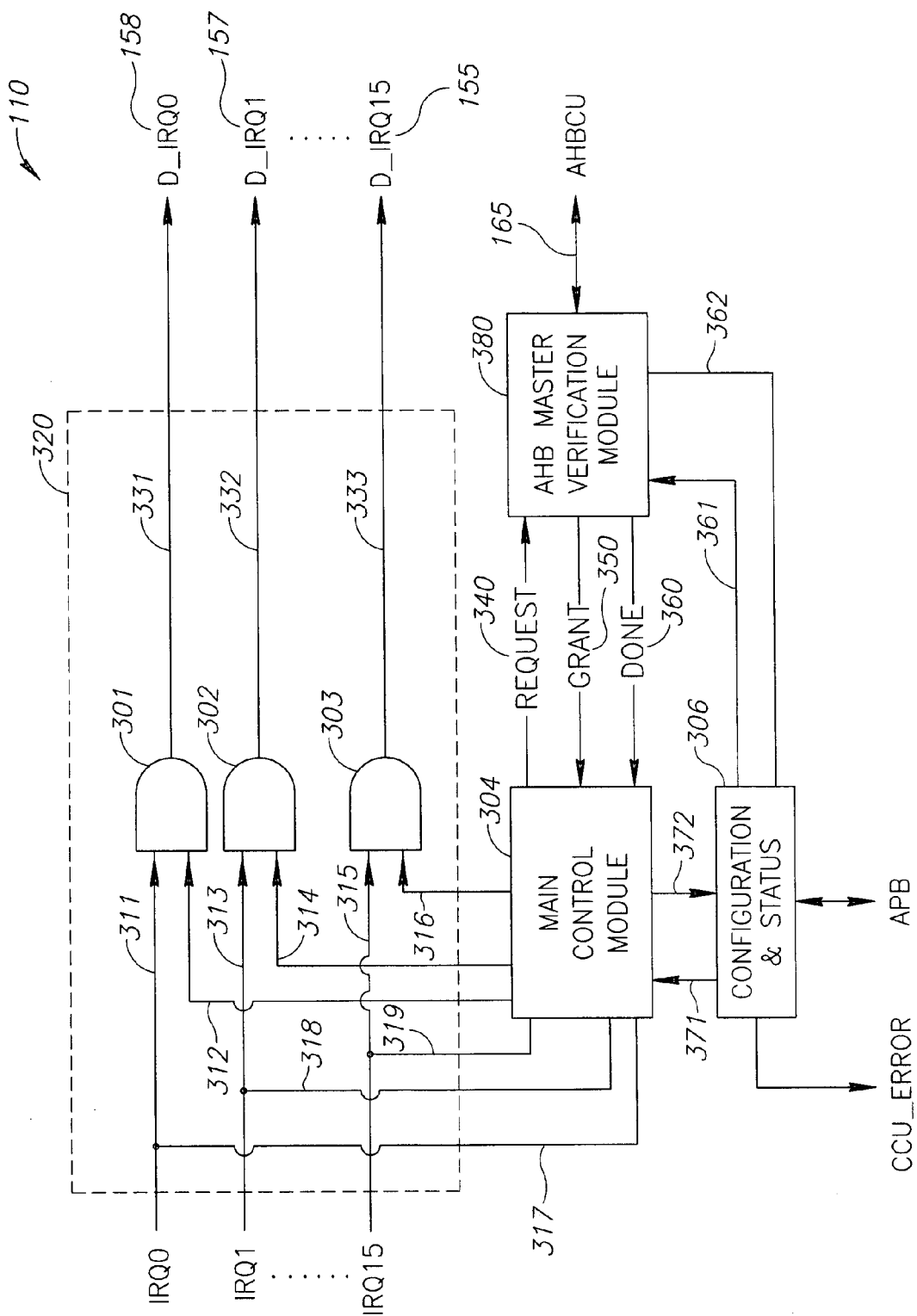
FIG. 3 shows a schematic drawing of a coherency control module, in accordance with some exemplary embodiments of the disclosed subject matter.

FIG. 3 shows a schematic drawing of a coherency control module, in accordance with some exemplary embodiments of the disclosed subject matter. Coherency Control Module (CCU) 110 may comprise an interrupt module 320, a main control module 304, a validation module 380 and a configuration and status module 306. The interrupt module 320 may further comprise a plurality of AND logic gates for receiving a plurality of interrupt requests. The validation module 380 may be further configured for validating the completion of the writing instructions with a single validation process and the main control module 304 may be further configured for resuming the plurality of interrupt requests upon completion of the validating process.

The interrupt module 320 may comprise a plurality of AND logic gates showing in the figure as 301, 302 and 303 for receiving a received interrupt request for interrupting a CPU (not shown). Each of the received interrupt request is from one of a plurality of modules. The received interrupt request is for notifying the CPU (not shown) about a writing operation of a first data by the one of the plurality of modules to a shared memory (not shown). The shared memory (not shown) is accessible to the plurality of modules (not shown) through a shared bus (not shown).

The main control module 304 is configured for suspending the received interrupt request until validating the completion of the execution of the writing of the first data and for resuming, the interrupt request after the completion of the execution of the writing is validated.

The validation module 380 is configured for validating the completion of one or more writing instructions. The validation module 380 may interact with the bus arbiter (not shown). The validation module may be an AHB master. The interacting may be performed via the AHBCU 165. The interacting is for transferring read or write instructions to the shared bus for performing the validation and for receiving the status of the read and the write instructions. The verification may be performed, for example, by a programmable number of writes method which is described in greater details in FIG. 5 or by the read after write method.

Each of the AND logic gate may handle a specific module. First input line of each of the AND logic gate may be an interrupt line which is connected between the specific module and the Coherency control module (CCU) 110. The interrupt line is for an interrupt request for notifying the CPU (not shown) about the writing of data to the shared memory (not shown). In the exemplary figure, first input line IRQ0 311 connects a first module (not shown) to the AND logic gate 301, second input line IRQ1 313 connects a second module (not shown) to the AND logic gate 302 and input line IRQ15 315 connects a third module (not shown) to the AND logic gate 303.

The first input line of each of the AND logic gate is connected with another line from the main control module for transmitting the received interrupt request and the notification about the completion of the interrupt request to the main control module 304. In the exemplary diagram, the first input line 311 is connected with line 317 to the main control module 304, the first input line 313 is connected with line 318 to the main control module 304 and the first input line 315 is connected with line 319 to the main control module 304.

Second input line of each of the AND logic gate may be connected to the main control module 304 for suspending and for resuming the interrupt request received from the module to which the AND logic gate is connected. The suspending and the resuming may be controlled by the main control module 304. In the exemplary figure, second input line 312 connects the AND logic gate 301 the main control module 304, second input line 314 connects the AND logic gate 302 to the main control module 304 and second input 316 connects the AND logic gate 303 the main control module 304.

The output line of each AND logic gate may be connected to the CPU (not shown) via the ICU (not shown) for interrupting the CPU; wherein the interrupting is for notifying about the completion of the execution of the writing of the data by the module to which the AND logic gate is connected. The notifying is performed after verifying the completion of the execution of the writing. In the exemplary figure, an output line 331 of the AND logic gate 301 is connected to the ICU (not shown) via the IRQ0 158; an output line 332 of the AND logic gate 302 is connected to the ICU (not shown) via the IRQ0 157; and an output line 333 of the AND logic gate 303 is connected to the ICU (not shown) via the IRQ15 155. The output line 331 is for notifying the completion of the execution of the writing of the data from the first module; the output line 332 is for notifying the completion of the execution of the writing of the data from the second module and the output line 333 is for notifying the completion of the execution of the writing of the data from the third module.

Each of the AND Logic gate is connected to the main control module 304 for transmitting the interrupt request that is issued by the module to which the AND logic gate is connected to the main control module 304; Such an interrupt request may cause the main control module 304 to start the verification process for verifying the completion of the execution of the writing of the data. In some exemplary cases, more than one interrupt request may be issued before the verification process is started; in such cases, the verification process serves all the interrupt request that are received until the verification process starts.

First and second input line of each AND logic gate may be initialized with "0", causing the output line to be "0". Upon receiving an interrupt request from a module, the first input line may be set to "1"; In such a case, the output line of the AND logic gate remains "0". In addition, upon receiving an interrupt request from a module, a notification about the interrupt request is transmitted to the main control module 304, as explained herein before. In some cases, the main control module 304 receives a notification about a new interrupt request wherein there isn't any active verification process and wherein there isn't any other pending interrupt request. in such cases, the main control module 304 starts a verification process for verifying the writing. By a pending interrupt request is meant, an interrupt request that is suspended and for which a verification process has not been started yet. In some other cases, the main control module 304 receives a notification about a new interrupt request wherein there isn't any active verification process and wherein there are already one or more pending interrupt requests. In such cases, the main control module 304 issues a single verification process for all the pending interrupt requests. Yet in some other cases, the main control module 304 receives a notification about a new interrupt request wherein there is already an active verification process. In such cases, the main control module 304 starts a new verification process upon completing the active verification process. The new interrupt request is pended until the current verification process is completed.

When the completion of the execution of the writing of all the interrupt requests that are served by the current verification process is verified, the main control module 304 may set the value of the corresponding second input line of all the interrupt requests to "1". Such a setting causes the resuming of all the interrupt requests that are served by the current verification process.

The main control module 304 may set the second input line to zero after receiving an indication that the interrupt request was completed for suspending the next interrupt request.

For example, if the first module writes data to the shared memory, the first module issues an interrupt request via the IRQ0 311 causing the IRQ0 311 to be set to "1". The main control module 304 receives the request via line 317 and may start a verification process. After verifying the completion of the execution of the writing, the main control module 304 sets the input line 312 to "1". As a result, the output line D_IRQ0 331 is set to 1, causing the interrupt request from the first module to be resumed. Upon completing the interrupt request, the interrupt line 311 may be set to "0" by the first module, the "0" is propagated to the main control module 304 through the line 317. As a result, the main control module 304 sets the second input line 312 to "0" for suspending a new interrupt request.

Upon detecting a new interrupt request indicating a writing operation from one of the modules, the main control module 340 issues a write request to the memory controller (not shown) via request line 340 to the AHB master 380. The write request is for verifying the completion of the execution of the writing operation. When the write request of the main control module 304 is granted by the memory controller (not shown), the main control module 304 receives a notification via grant line 350 and starts the verification process. The verification may be done by using the programmable number of writes method as described in FIG. 5 or by using the read after write method. When the verification process is completed, the main control module 304 receives a notification via a done line 360. During the time frame between receiving the new interrupt request and receiving a grant via grant line 350, other interrupt requests from other modules may be received. All the interrupt request that are received during this time frame are resumed upon receiving a done notification from the done line 360. Thus, a single verification may serve more than one interrupt request. An interrupt request that is received during the verification process (after receiving the grant and before receiving the done) is suspended and is pended. This interrupt request is served by the next verification process and is resumed upon completion of the next verification process. The configuration and status module 306 may configure the main control module 304 via configuration line 371. Configuration may comprise the number of words to write in the programmable number of writes, the mode of operation (on/off) and the like. The configuration and status module 306 may receive one or more statuses from the main control module 304 via line 372. The configuration and status module 306 may configure the validation module 380 via line 361 and may receive status from the validation module 380 via line 362.

Figure 4:
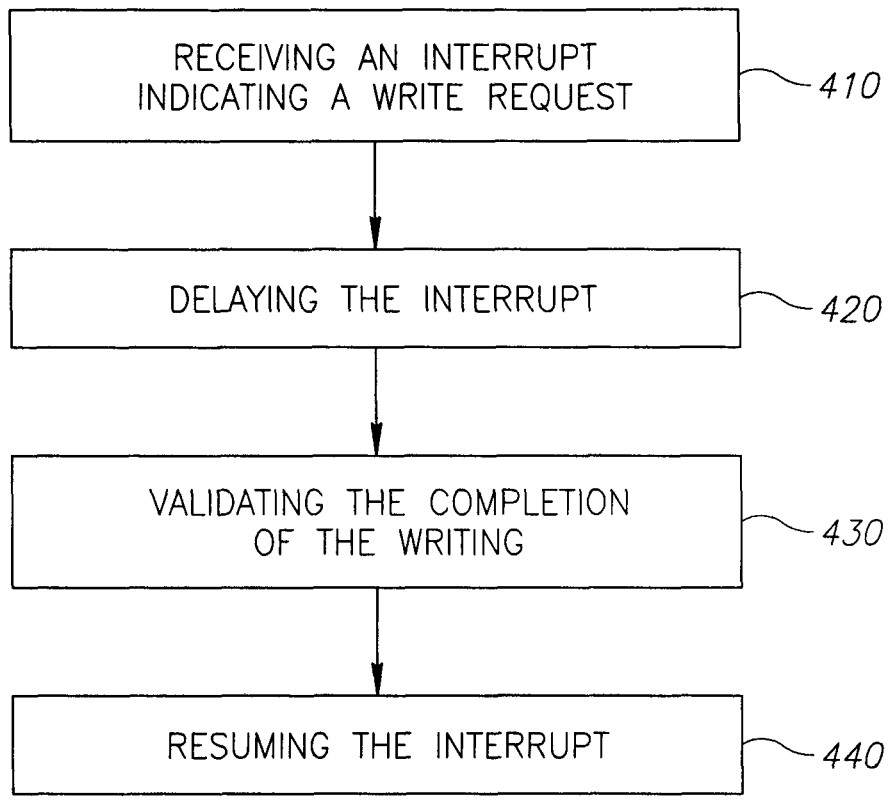
FIG. 4 shows a flowchart diagram of a method for coherency control, in accordance with some exemplary embodiments of the disclosed subject matter.

FIG. 4 shows a flowchart diagram of a method for coherency control, in accordance with some exemplary embodiments of the disclosed subject matter.

In step 410, an interrupt request notifying a writing operation to a shared memory from one of the modules connecting to a bus may be received. The shared memory is accessible to the plurality of modules through the shared bus.

In step 420, the interrupt may be suspended.

In step 430, the completion of the execution of the writing to the shared memory may be validated. The validating may be performed by read after write method, or by a programmable number of writes method, which is described in greater details in FIG. 5. According to some embodiments, the validating may be performed after receiving and suspending a plurality of interrupt request in order to minimize the number of write instructions that are required for the validation. According to some other embodiments, the validation may be performed even when there are no pending write instructions from any of the hardware bus modules; for example, when the last write instruction has been flushed by previous validation.

In step 440, the interrupt request may be resumed for notifying the CPU about the completion of the execution of the writing.

Figure 5:
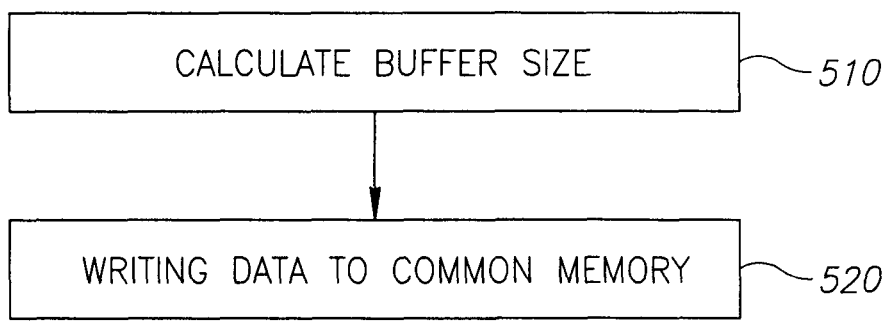
FIG. 5 shows a flowchart diagram of a programmable number of writes method for validating the writing, in accordance with some exemplary embodiments of the disclosed subject matter.

FIG. 5 shows a flowchart diagram of the programmable number of writes method for validating the writing, in accordance with some exemplary embodiments of the disclosed subject matter. The method may be used per each bus that is controlled by a multi-port memory controller. The method is termed herein programmable number of writes.

In step 510, the buffer size may be calculated. The multi port memory controller may control a plurality of buses. Each bus may transfer the data to a dedicated port in the multiport memory controller. In the case of conjunction, the data may be cached in the dedicated buffer. The buffer size that is calculated in step 510 comprises the size of the bus arbiter buffer and the size of the buffer dedicated to the bus in the multi port memory controller. In some exemplary embodiments, the bus arbiter does not comprise a buffer, in such a case, the buffer size comprises the size of the dedicated buffer only.

In step 520, a data may be written to a shared memory. Step 520 may be performed after one or more interrupt requests notifying writing of a data to the shared memory are received from one or more module connecting to the same bus. The size of the data that is written is equal or greater to the size that is calculated in step 510. The writing of the data may push any data that is kept in of the bus arbiter buffer and in the dedicated buffer in the multi port memory controller. Pushing the data that is cached in the bus ensures that the data to be written is actually written to the shared memory and is not kept in the buffer.

The programmable number of writes method, has better performance comparing to the read after write method as pending data queued in the buffer is pushed out of the buffer; however, the method does not wait that the pushed-out instructions are actually written into the shared memory. This mode is useful when a memory controller (such as a DRAM controller) can assure coherency for instructions to the same memory locations.

The read after write method may require some latency to complete, comparing to the programmable number of writes method as the method waits until after the shared memory is granted to perform the single word write followed by the single word read transfers.

Figure 6:
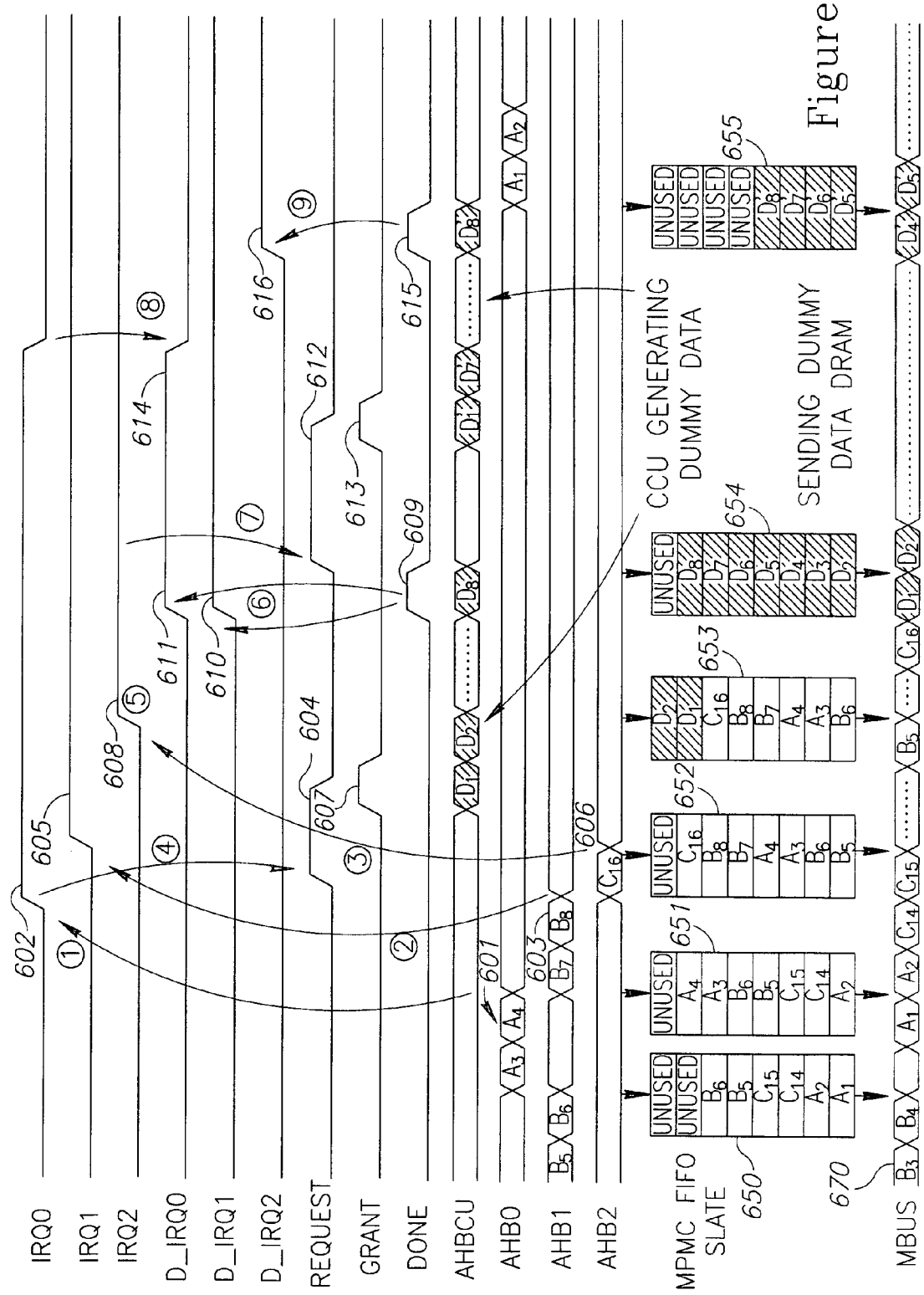
FIG. 6 shows a first exemplary scenario of a method for coherency control, in accordance with some exemplary embodiments of the disclosed subject matter.

FIG. 6 shows a first exemplary scenario of a method for coherency control; in accordance with some exemplary embodiments of the disclosed subject matter. At 601, a write instruction from module 0 is received through AHB0. At 602, which may occur as a result of 601, an interrupt request is issued through IRQ0 line. The interrupt request is for notifying the CPU about the write instruction of module 0. At 603, a write instruction from module 1 through AHB1 is received. At 604 which may occur as a result of 602 (issuing an interrupt request through IRQ0 line), the CCU issues a request for starting the first verification process. At 605, which may occur as a result of 603 (receiving a write instruction from module 1), an interrupt request is issued through IRQ1 line. The interrupt request is for notifying the CPU about the write instruction of module 1. At 606, a write instruction from module 2 through AHB2 is received. At 607, the CCU is granted the access to the shared bus for starting the first verification process. At 608, which may occur as a result of 606, (receiving a write instruction from module 2), an interrupt request is issued through IRQ2 line. At 609, the done line is set to 1, indicating the completion of the first verification process. At 610, which may occur as a result of the completion of the first verification process at 609, D-IRQ 1 is resumed. At 611 D_IRQ0 which may occur as a result of the completion of the first verification process at 609, D-IRQ0 is resumed. Since IRQ0 and IRQ1 have been issued before the grant of the access to the shared memory, DIQR0 and DIRQ 1 are resumed upon the completion of the first verification process. DIRQ-2 is not resumed yet because the interrupt request through IRQ2 line at 608 was issued after receiving the grant at 607. Resuming D-IQR0 and D-IRQ1 may cause the notification of the completion of the execution of the write instructions from module 0 and from module 1 respectively. At 612 which may occur as a result of 608 (issuing an interrupt request through IRQ2), the CCU issues a request for starting a second verification process. The second verification process is for verifying the write instruction of module 2. At 613, the CCU is granted the access to the shared bus for starting the second verification process. At 614, which may occur as a result of completion of the interrupt request IRQ0, D-IRQ0 is set to 0 for suspending the next incoming interrupt request from IRQ0. At 615, the done line is set to 1, indicating the completion of the second verification process. At 616, which may occur as a result of the completion of the second verification process at 615, D-IRQ2 is resumed. Resuming DIQR2 may cause the notification to the CPU of the completion of the execution of the write instructions from module 2.

Steps 650-655 show the changes in the states of the buffer of the multi port memory controller in the exemplary scenario. The buffer may be a First In First Out (FIFO) buffer. At 650, the buffer comprises A1 and A2 which is a portion of the data that was written by module 0, C14 and C15, which is a portion of the data that was written by module 2 and B5 and B6, which is a portion of the data that was written by module 1 the buffer also comprises two unused words. At 651, which is describes the state of the buffer corresponding to step 601, A3 and A4 are pushed into the buffer, A1 is pushed out of the buffer and there is one unused word. At 652, which describes the state of the buffer corresponding to steps 606 and 603, B7 B8 and C16 are pushed into the buffer while A2, C14 and C15 are pushed from the buffer to the memory and there is one unused word in the buffer. At 653, which is describes the state of the buffer following step 607, the CCU starts pushing dummy data for performing the programmable number of writes. Thus the dummy words D1 and D2 are pushed into the buffer while B5 is pushed out of the buffer. At this step, there are no un-used words in the buffer, since the CCU attempts to flush the buffer by filling the buffer with dummy words. At 654, which describes the state of the buffer following step 609, B6, A3, A4, B7, B8, C16 and D1 are pushed out from the buffer, and the rest of the dummy words D3-D8 are pushed into the buffer. Thus, at 654, all the write instructions from Module 0, module 1 and module 2 are completed by pushing the dummy words into the buffer; however, the interrupt request of module 2 is not resumed, since the interrupt request was issued after the CCU received the grant to write the dummy words, as explained before. At 655, which describes the state of the buffer following step 613, the CCU starts a new verification process, since the interrupt request of module 2 is still suspended. Since the data written by module 2 has already been written to the memory, this operation is redundant; however such a redundant operation is as a result of the simplicity of the exemplary embodiment in which the Coherency Control Module (CCU) controls only the interrupt requests without having to control the data. Normally, redundant operations as such are infrequent.

Figure 7:
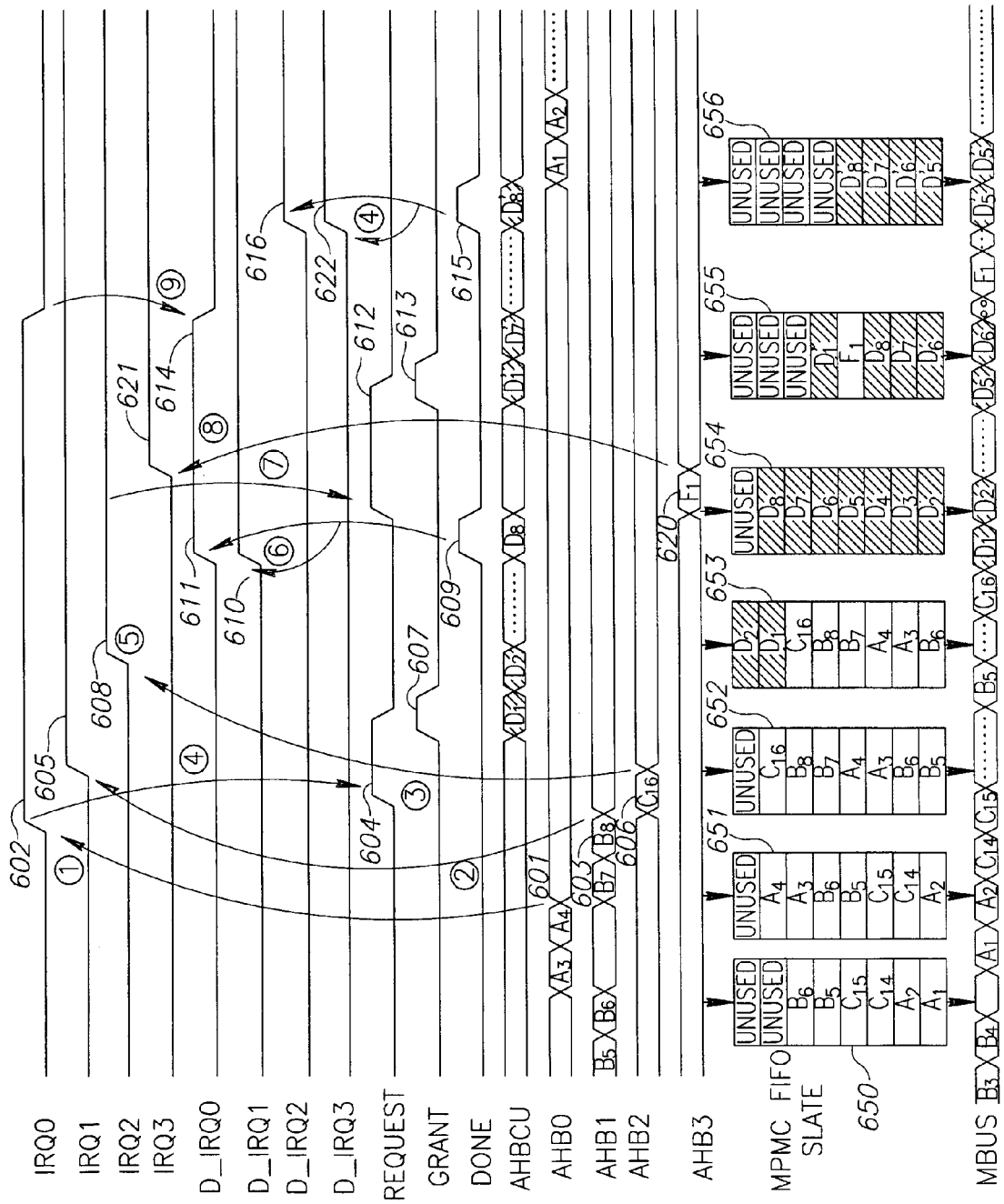
FIG. 7 shows a second exemplary scenario of a method for coherency control, in accordance with some exemplary embodiments of the disclosed subject matter.

FIG. 7 shows a second exemplary scenario of a method for coherency control; in accordance with some exemplary embodiments of the disclosed subject matter. FIG. 7 comprises the steps of FIG. 6 and in addition comprises the steps 620, 621 and 622. At 620 which occurs after 612 in which the Coherency Control Module (CCU) requests the bus for performing the second verification process, and before 613 in which the CCU grants the access to the bus, Module 3 issues a write instruction for writing data F1 into the memory. At 622, the CCU resumes D-IRQ3 for issuing an interrupt to the CPU about the completing of the writing of a data F1 by module 3. The FIFO states shown in 655 and 656 describe the scenario in which the second verification process pushes the data written by module 3 to the shared memory.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly notifies otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More o specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been o presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for data coherency; the method comprising:
   receiving by a coherency control module (CCM), an interrupt request for interrupting a central processing unit (CPU), wherein the CPU is coupled to the CCM; wherein the interrupt request is from one of a plurality of modules; wherein the interrupt request is for notifying of a writing instruction of a first data by the one of the plurality of modules to a shared memory; and
wherein the shared memory is accessible to the plurality of modules through a shared bus;
   suspending, by the CCM, the interrupt request by preventing the CPU from receiving the interrupt request;
   validating, by the CCM, a completion of execution of the writing instruction; and
   resuming the interrupt request by sending the interrupt request to the CPU.

2. The method of claim 1, wherein the validating is performed after the suspending.

3. The method of claim 1, wherein the resuming is performed after the completion of execution of the writing is validated.

4. The method of claim 1, wherein the resuming is performed for notifying the CPU about the completion of execution of the writing instruction.

5. The method of claim 1, wherein the validating further comprises writing by the CCU a second data to the shared memory;
   wherein a size of the second data is equivalent to a size of a buffer of a memory controller, the buffer is used for buffering data received over a bus that is coupled to the one of the plurality of modules; and
   wherein the writing of the second data is for pushing said first data from the buffer of the memory controller to the shared memory.

6. The method of claim 1, wherein the validating further comprising read after write.

7. The method of claim 1, wherein the receiving further comprising receiving a plurality of interrupt request from a plurality of modules,
   the suspending further comprises suspending the plurality of interrupt requests and the resuming further comprises resuming the plurality of interrupt requests thereby to perform a single validating for the plurality of interrupt requests.

8. The method according to claim 1, wherein the validating comprises
   sending by the CCU a write request to a memory controller of the shared memory,
   receiving by the CCU a grant indication indicative that the write request is granted; and
   verifying that the execution of the writing instruction was completed.

9. The method of claim 5, wherein the size of the second data is equivalent to a sum of the size of a buffer of the memory controller and a size of a buffer of a bus arbiter; and
   wherein the writing of the second data is for pushing said first data from the buffer of the memory controller and from the buffer of the bus arbiter to the shared memory.

10. An apparatus for coherency control; the apparatus comprising: an interrupt module (320) that is configured for receiving an interrupt request for interrupting a central processing unit (CPU) and for suspending the interrupt request by preventing the interrupt request from reaching the CPU; wherein the interrupt request is from one of a plurality of modules; wherein the interrupt request is for notifying of a writing of a first data by the one of the plurality of modules to a shared memory, and wherein the shared memory is accessible to the plurality of modules through a shared bus; a validation module (380) that is configured for validating a completion of execution of the writing of the first data; and a main control module (304) that is configured for resuming the interrupt request by sending the interrupt request to the CPU.

11. The apparatus of claim 10, wherein the interrupt suspend module further comprises a plurality of AND logic gates for receiving a plurality of interrupt requests wherein the validation module is further configured for validating the plurality of interrupt requests with a single validation process and the main control module is further configured for resuming the plurality of interrupt requests upon the completion of execution of the single validation process.

12. The apparatus of claim 10, wherein the validation module is further configured for validating after the suspending.

13. The apparatus of claim 10, wherein the main control module is further configured for resuming after the completion of execution of the writing is validated.

14. The apparatus of claim 10, wherein the validating module is further configured for writing, during the validating of the completion of execution of the writing of the first data, a second data to the shared memory; wherein a size of the second data is equivalent to a size of a buffer of a memory controller, the buffer is used for buffering data received over a bus that is coupled to the one of the plurality of modules; and wherein the writing of the second data is for pushing said first data from the buffer of the memory controller to the shared memory.

15. The apparatus according to claim 10 wherein the validation module is configured for sending a write request to a memory controller of the shared memory, receiving by the CCU a grant indication indicative that the write request is granted; and
verifying that the execution of the writing instruction was completed.

16. The apparatus of claim 11, wherein the size of the second data is equivalent to a sum of the size of a buffer of the memory controller and a size of a buffer of a bus arbiter; and
wherein the writing of the second data is for pushing said first data from the buffer of the memory controller and from the buffer of the bus arbiter to the shared memory.

17. A method for data coherency; the method comprising:
receiving by a coherency control module (CCM), an interrupt request for interrupting a central processing unit (CPU), wherein the CPU is coupled to the CCM; wherein the interrupt request is from one of a plurality of modules; wherein the interrupt request is for notifying of a writing instruction of a first data by the one of the plurality of modules to a shared memory; and
wherein the shared memory is accessible to the plurality of modules through a shared bus;
preventing, by the CCM, the CPU from receiving the interrupt request;
writing by the CCM to at least one buffer coupled between the CCM and the shared memory a second data thereby pushing the first data from the at least one buffer; and
sending the interrupt request to the CPU after the first data is pushed from the at least one buffer regardless of whether the first data is actually written to the shared memory.

18. The method according to claim 17 wherein the at least one buffer comprises a buffer of a memory controller that is used for buffering data received over a bus that is coupled to the one of the plurality of modules.

19. The method according to claim 17 wherein the at least one buffer comprises a buffer of the memory controller and a buffer of the bus arbiter to the shared memory; and
wherein a size of the second data is equivalent to a sum of the size of the buffer of the memory controller and a size of the buffer of the bus arbiter.

* * * * *